G. McALEER.
Folding-Chair
No. 8,004. Reissued Dec. 18, 1877.
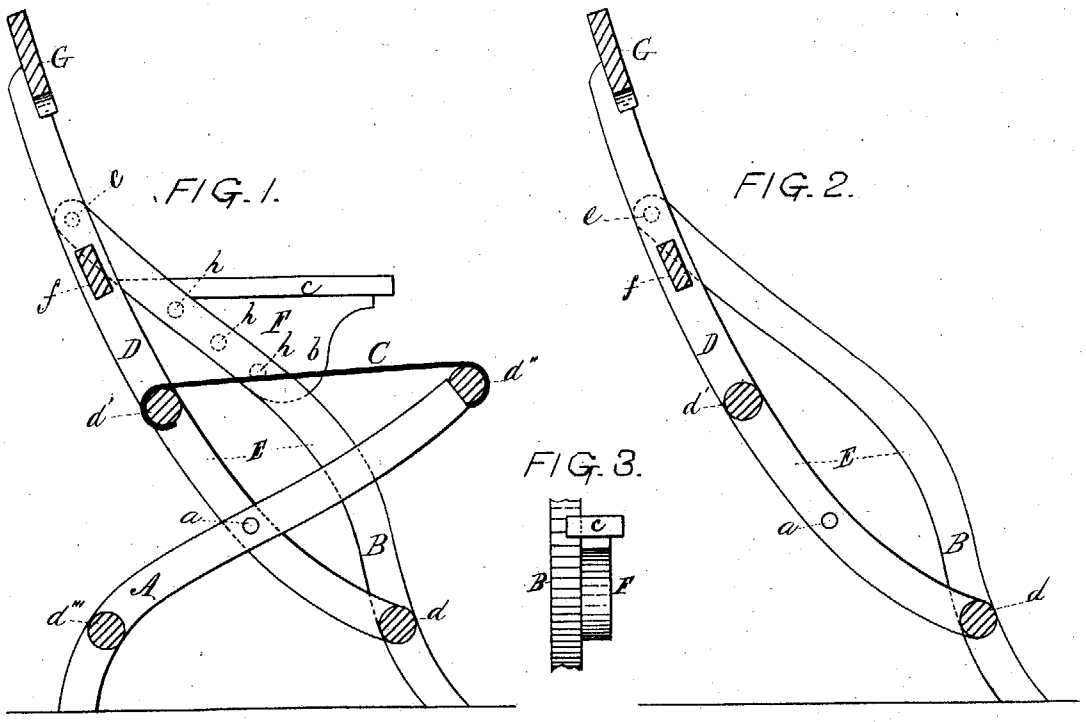
Witnesses;
Thos. H. Dodge
Edwin E. Moore
Inventor;
George McAleer
N. PETERS, PHOTO-LITHOGRAPHER, WASHINGTON, D. C.

UNITED STATES PATENT OFFICE.

GEORGE McALEER, OF WORCESTER, MASSACHUSETTS.

IMPROVEMENT IN FOLDING CHAIRS.

Specification forming part of Letters Patent No. 169,016, dated October 19, 1875; Reissue No. 8,004, dated December 18, 1877; application filed December 10, 1877.

*To all whom it may concern:*

Be it known that I, GEORGE McALEER, of Worcester, in the county of Worcester and State of Massachusetts, have invented new and useful Improvements in Folding Chairs; and I hereby declare that the following, taken in connection with the drawings which accompany and form part of this specification, is such a description thereof as will enable those skilled in the art to make and use the same.

My invention consists in the rigid combination of two members to form the side frame of a folding chair, whereby they brace each other; and it further consists in the combination, with the frame of a folding chair, of arm-supporting brackets, substantially as hereinafter described.

Similar letters of reference indicate corresponding parts.

In the accompanying drawings, Figure 1 is a central vertical section from front to rear of a folding chair constructed according to my improvements. Fig. 2 is a side view of the side frame constructed according to my improvements; and Fig. 3 is a front view of the arm-supporting bracket as attached to the auxiliary member B of the back-frame D.

In the construction of this improved folding chair the rear legs A cross the side frames E, their upper ends being prolonged upward and forward to support the front of the seat C by means of a stretcher, *d''*, which connects their upper ends, (the rear of the seat being supported by a stretcher, *d'*, in the back,) and are movably connected to the side frames E by means of pivots, as shown at *a*, and to each other permanently by means of suitable rounds or stretchers *d'' d'''*, as clearly shown in Fig. 1 of the drawings.

The side frame E is composed of the members B and D, rigidly connected together by suitable means—in this instance by a stretcher, *d*, at the bottom, and a screw, *e*, at the top, as shown in full and dotted lines in Figs. 1 and 2 of the drawings; and said frame E is connected to the corresponding frame on the opposite side of the chair by a suitable back-piece, G, slat *f*, and stretchers *d d'*. (Shown in section in Figs. 1 and 2 of the drawings.)

The arm-supporting bracket F is attached to the side frame E on each side of the chair, at a proper distance above the seat C, to afford convenient and easy rests or supports for the arms of the occupant of the chair, while their forward ends are not attached to or supported by the upper ends of the rear legs, thus leaving free and open spaces on each side of the front of the seat, for the greater convenience and comfort of the limbs of the occupant of the chair. In this instance the arm-supporting brackets F are rigidly secured to the back-frame by an intermediate or auxiliary member, B, by means of screws *h*. (Represented in dotted lines in Fig. 1.)

To fold this improved folding chair it is only necessary to cause the front and rear seat-stretchers *d' d''* to approach each other, when the chair is readily and compactly folded for transportation or storage without attaching or detaching any of its parts.

In lieu of pivoting the back-frame to the rear legs, the front legs may be pivoted to the rear legs.

Having described my improved folding chair, what I claim therein as new and of my invention, and desire to secure by Letters Patent, is—

1. The combination of the rear-leg frame A and seat C with the rigid side frames E, substantially as described.

2. The combination, with the seat C and rigid side frames E, of the arm-supporting brackets F, substantially as and for the purposes set forth.

GEORGE McALEER.

Witnesses:
THOS. H. DODGE,
EDWIN E. MOORE.